United States Patent
Newell et al.

(10) Patent No.: US 8,934,717 B2
(45) Date of Patent: Jan. 13, 2015

(54) AUTOMATIC STORY CREATION USING SEMANTIC CLASSIFIERS FOR DIGITAL ASSETS AND ASSOCIATED METADATA

(75) Inventors: Catherine D. Newell, Rochester, NY (US); Mark D. Wood, Penfield, NY (US); Kathleen M. Costello, Rochester, NY (US); Robert B. Poetker, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 1345 days.

(21) Appl. No.: 11/935,737

(22) Filed: Nov. 6, 2007

(65) Prior Publication Data
US 2008/0304808 A1    Dec. 11, 2008

Related U.S. Application Data

(63) Continuation-in-part of application No. 11/758,358, filed on Jun. 5, 2007, now abandoned.

(51) Int. Cl.
| | |
|---|---|
| G06K 9/00 | (2006.01) |
| G11B 27/034 | (2006.01) |
| G06F 17/30 | (2006.01) |
| G11B 27/32 | (2006.01) |

(52) U.S. Cl.
CPC ........ G11B 27/034 (2013.01); G06F 17/30029 (2013.01); G06F 17/30038 (2013.01); G06F 17/30056 (2013.01); G11B 27/322 (2013.01)
USPC ........................................................ 382/190

(58) Field of Classification Search
USPC .................... 382/100, 159, 190, 224, 229; 715/202–206, 208
See application file for complete search history.

(56) References Cited

U.S. PATENT DOCUMENTS

| | | | |
|---|---|---|---|
| 5,499,366 A | * | 3/1996 | Rosenberg et al. .................... 1/1 |
| 6,230,312 B1 | * | 5/2001 | Hunt .............................. 717/108 |
| 6,282,317 B1 | | 8/2001 | Luo et al. |
| 6,351,556 B1 | | 2/2002 | Loui et al. |
| 6,389,181 B2 | * | 5/2002 | Shaffer et al. ................. 382/305 |
| 6,396,963 B2 | * | 5/2002 | Shaffer et al. ................. 382/305 |
| 6,480,840 B2 | | 11/2002 | Zhu et al. |
| 6,492,998 B1 | * | 12/2002 | Kim et al. ...................... 715/723 |
| 6,504,951 B1 | | 1/2003 | Luo et al. |

(Continued)

FOREIGN PATENT DOCUMENTS

| | | |
|---|---|---|
| EP | 1 377 045 | 1/2004 |
| EP | 1 443 428 | 8/2004 |

(Continued)

OTHER PUBLICATIONS

Office Action on Japanese Application 2010-511182, mailed Oct. 15, 2013. (English translation not available).

(Continued)

*Primary Examiner* — Shervin Nakhjavan

(57) ABSTRACT

A method and system for automatically creating an image product based on media assets stored in a database. A number of stored digital media files are analyzed to determine their semantic relationship to an event and are classified according to requirements and semantic rules for generating an image product. Rule sets are applied to assets for finding one or more assets that can be include in a story product. The assets, which best meet the requirements and rules of the image product are included.

20 Claims, 12 Drawing Sheets

(56) References Cited

U.S. PATENT DOCUMENTS

| | | | |
|---|---|---|---|
| 6,587,839 B1* | 7/2003 | McIntyre et al. | 705/26.8 |
| 6,606,411 B1 | 8/2003 | Loui et al. | |
| 6,629,104 B1* | 9/2003 | Parulski et al. | 382/307 |
| 6,636,648 B2* | 10/2003 | Loui et al. | 382/284 |
| 6,697,502 B2 | 2/2004 | Luo | |
| 6,766,363 B1* | 7/2004 | Rothschild | 709/219 |
| 6,771,801 B1* | 8/2004 | Fisher et al. | 382/112 |
| 6,782,397 B2* | 8/2004 | Tanaka | 715/238 |
| 6,865,297 B2* | 3/2005 | Loui et al. | 382/224 |
| 6,940,545 B1 | 9/2005 | Ray et al. | |
| 7,035,467 B2* | 4/2006 | Nicponski | 382/224 |
| 7,062,454 B1* | 6/2006 | Giannini et al. | 705/26.81 |
| 7,092,966 B2 | 8/2006 | McIntyre | 707/104.1 |
| 7,110,575 B2 | 9/2006 | Chen et al. | |
| 7,233,684 B2 | 6/2007 | Fedorovskaya et al. | 382/118 |
| 7,272,788 B2* | 9/2007 | Anderson et al. | 715/210 |
| 7,286,723 B2* | 10/2007 | Taugher et al. | 382/305 |
| 7,333,967 B1* | 2/2008 | Bringsjord et al. | 706/45 |
| 7,362,919 B2 | 4/2008 | Das et al. | |
| 7,487,072 B2* | 2/2009 | Semple et al. | 703/3 |
| 7,586,524 B2* | 9/2009 | Tsue et al. | 348/231.2 |
| 7,711,145 B2 | 5/2010 | Gallagher | |
| 7,889,794 B2 | 2/2011 | Luo et al. | |
| 7,970,240 B1* | 6/2011 | Chao et al. | 382/305 |
| 8,135,684 B2 | 3/2012 | Fedorovskaya et al. | |
| 8,201,073 B2* | 6/2012 | Canora et al. | 715/201 |
| 8,315,463 B2 | 11/2012 | Gallagher et al. | |
| 8,330,830 B2 | 12/2012 | Manico et al. | |
| 8,401,334 B2* | 3/2013 | Neville et al. | 382/284 |
| 8,570,586 B2* | 10/2013 | Calhoon et al. | 358/1.18 |
| 2001/0032151 A1* | 10/2001 | Paul et al. | 705/26 |
| 2001/0041020 A1* | 11/2001 | Shaffer et al. | 382/305 |
| 2002/0016971 A1* | 2/2002 | Berezowski et al. | 725/105 |
| 2002/0154158 A1* | 10/2002 | Fukuda et al. | 345/723 |
| 2002/0161635 A1* | 10/2002 | Berg et al. | 705/14 |
| 2002/0199191 A1* | 12/2002 | Thursfield et al. | 725/37 |
| 2003/0128877 A1* | 7/2003 | Nicponski | 382/224 |
| 2003/0144923 A1* | 7/2003 | Capozzi et al. | 705/26 |
| 2003/0160824 A1* | 8/2003 | Szumla | 345/769 |
| 2003/0174217 A1* | 9/2003 | Kito et al. | 348/231.2 |
| 2004/0008180 A1* | 1/2004 | Appling, III | 345/156 |
| 2004/0044725 A1* | 3/2004 | Bell et al. | 709/203 |
| 2004/0081338 A1* | 4/2004 | Takenaka | 382/118 |
| 2004/0119875 A1 | 6/2004 | Hayaishi et al. | 348/362 |
| 2004/0172405 A1* | 9/2004 | Farran | 707/100 |
| 2004/0172419 A1* | 9/2004 | Morris et al. | 707/200 |
| 2004/0179719 A1 | 9/2004 | Chen et al. | |
| 2004/0208377 A1* | 10/2004 | Loui et al. | 382/224 |
| 2004/0254859 A1* | 12/2004 | Aslanian, Jr. | 705/27 |
| 2005/0063613 A1* | 3/2005 | Casey et al. | 382/305 |
| 2005/0084232 A1* | 4/2005 | Herberger et al. | 386/4 |
| 2005/0105775 A1 | 5/2005 | Luo et al. | |
| 2005/0105776 A1 | 5/2005 | Luo et al. | |
| 2005/0111737 A1* | 5/2005 | Das et al. | 382/190 |
| 2005/0116027 A1 | 6/2005 | Algiene et al. | |
| 2005/0131767 A1* | 6/2005 | Heins | 705/26 |
| 2005/0149970 A1* | 7/2005 | Fairhurst et al. | 725/47 |
| 2005/0206751 A1* | 9/2005 | Manico et al. | 348/239 |
| 2005/0216283 A1* | 9/2005 | Squilla et al. | 705/1 |
| 2006/0036949 A1* | 2/2006 | Moore et al. | 715/730 |
| 2006/0055992 A1* | 3/2006 | Koo | 358/527 |
| 2006/0061804 A1* | 3/2006 | Manico et al. | 358/1.15 |
| 2006/0080314 A1* | 4/2006 | Hubert et al. | 707/5 |
| 2006/0088207 A1* | 4/2006 | Schneiderman | 382/159 |
| 2006/0094462 A1* | 5/2006 | Nguyen et al. | 455/556.1 |
| 2006/0098941 A1* | 5/2006 | Abe et al. | 386/52 |
| 2006/0126944 A1 | 6/2006 | Loui et al. | |
| 2006/0129606 A1* | 6/2006 | Horvitz et al. | 707/104.1 |
| 2006/0242178 A1* | 10/2006 | Butterfield et al. | 707/100 |
| 2006/0251292 A1* | 11/2006 | Gokturk et al. | 382/103 |
| 2006/0251382 A1* | 11/2006 | Vronay et al. | 386/52 |
| 2006/0253783 A1* | 11/2006 | Vronay et al. | 715/730 |
| 2006/0271486 A1* | 11/2006 | Cross et al. | 705/51 |
| 2007/0008321 A1 | 1/2007 | Gallagher et al. | |
| 2007/0061759 A1 | 3/2007 | Klein, Jr. | |
| 2007/0098303 A1 | 5/2007 | Gallagher et al. | |
| 2007/0101271 A1* | 5/2007 | Hua et al. | 715/731 |
| 2007/0238082 A1* | 10/2007 | Ingrassia | 434/307 A |
| 2007/0300158 A1* | 12/2007 | Kasperkiewicz et al. | 715/731 |
| 2008/0021894 A1* | 1/2008 | Styles | 707/5 |
| 2008/0034374 A1* | 2/2008 | Davis | 719/314 |
| 2008/0205789 A1* | 8/2008 | Ten Kate et al. | 382/284 |
| 2009/0029771 A1* | 1/2009 | Donahue | 463/31 |
| 2009/0052736 A1* | 2/2009 | Kacker | 382/100 |
| 2012/0185538 A1* | 7/2012 | Lee et al. | 709/204 |

FOREIGN PATENT DOCUMENTS

| | | |
|---|---|---|
| JP | 2006-510113 | 3/2006 |
| WO | 01/77776 | 10/2001 |
| WO | 2006/065223 | 6/2006 |

OTHER PUBLICATIONS

D. E. Millard, C. Bailey, T. Brody, D. Dupplaw, W. Hall, S. Harris, K. R. Page, G. Power, and M. J. Weal, "Hyperdoc: An Adaptive Narrative System for Dynamic Multimedia Presentations," University of Southampton ECSTR-IAM02-006, 2003.

A. Gallagher, M. Das, and A. Loui, "User-Assisted People Search in Consumer Image Collections," in *IEEE Intern. Conf. on Multimedia and Expo (ICME)*, Beijing, China: IEEE, Jul. 2-5, 2007.

J. Lou and M. Boutell, "Natural Scene Classification Using Overcomplete ICA," *Pattern Recognition*, vol. 38, pp. 1507-1519, 2005.

A. Savakis, S. Etz, and A. Loui, "Evaluation of Image Appeal in Consumer Photography," in *SPIE Human Vision and Electronic Imaging*, Jan. 2000.

A. Loui and A. Savakis, "Automated Event Clustering and Quality Screening of Consumer Pictures for Digital Alburning," *IEEE Transaction on Multimedia*, vol. 5, pp. 390-402, 2003.

J. Grant and D. Beckett, Eds., "RDF Test Cases," World Wide Web Consortium, Feb. 2004. http://www.w3.org/TR/testcases/.

International Preliminary Report on Patentability for PCT/US2008/007017, issued Dec. 7, 2009.

International Search Report for PCT/US2008/007017, mailed Oct. 23, 2008.

Non-Final Office Action on U.S. Appl. No. 11/758,358, mailed Sep. 8, 2010.

\* cited by examiner

| METADATA ELEMENT | |
|---|---|
| TEMPORAL EVENT CLUSTERING (TEC), EVENTS & SUBEVENTS, STILLS | 201 |
| TEMPORAL EVENT CLUSTERING (TEC), EVENTS & SUBEVENTS, VIDEOS | 202 |
| CBIR | 203 |
| SCENE CLASSIFIERS | 204 |
|     INDOOR | |
|     OUTDOOR | |
|     NATURAL/MANMADE | |
|     OPEN/CLOSED | |
|     SUNSET | |
|     BEACH | |
|     FALL FOLIAGE | |
|     CITY | |
|     FIELD | |
|     MOUNTAIN | |
|     SKY | |
|     GRASS | |
|     SNOW | |
|     WATER | |
|     SAND | |
|     CLOUDS | |
| FACE DETECTION | 205 |
| FACE RECOGNITION | 206 |
| LOCATION BASED ON GPS, HIGH LEVEL LOCATIONS | 207 |
| EVENT CLASSIFICATION | 208 |
|     VACATION | |
|     SPORTS (INDOOR, WATER, TEAM, GRASS, SPECTATORS) | |
|     PARTY | |
|     FAMILY MOMENTS | |
| IMAGE VALUE INDEX | 209 |
|     TECHINICAL | |
| VIDEO KEY FRAME EXTRACTION | 210 |
| EXIF DATA | 211 |

```
<ruleset name="MothersDayAlbum" friendlyName="Mothers' Day Album" sortResults="false">
    <rule max="2">
        <desc>Pictures only containing #PERSON</desc>
        <definition>
        (?pic ?date ?ivi)
        (containsPerson ?pic #PERSON)(belongsTo ?pic #OWNER)
        (setof ?p (containsPerson ?pic ?p) ?identifiedPeople)(length ?identifiedPeople ?l)(= ?l 1)
        (hasIVI ?pic ?ivi)
        (capturedOn ?pic ?date)
        </definition>
    </rule>
    <rule max="3">
        <desc>Pictures containing just #PERSON and all her children</desc>
        <definition>
        (?pic ?date ?ivi)
        (setof ?s (parent #PERSON ?s) ?children)(append ?children (#PERSON) ?momPlusKids)
        (containsPerson ?pic #PERSON)(belongsTo ?pic #OWNER)
        (setof ?s2 (containsPerson ?pic ?s2) ?inPic)(eqSets ?momPlusKids ?inPic)
        (capturedOn ?pic ?date)
        (hasIVI ?pic ?ivi)
        </definition>
    </rule>
    <rule max="1">
        <desc>Best picture of #PERSON and each child</desc>
        <definition>
        (?pic ?date ?ivi)
        (parent #PERSON ?child)
        (bestPictureContaining ?pic #PERSON ?child)
        (hasIVI ?pic ?ivi)(capturedOn ?pic ?date)
        </definition>
    </rule>
    <rule max="2">
        <desc>video snippet</desc>
        <definition>
        (?movie ?date ?date)
        (eventIsOfEventType ?e !!"FamilyMoment")
        (eventContains ?e ?movie)
        (assetIsVideo ?movie)(videoHasLength ?movie ?len)
        (literalStringIsLT ?len "00:00:60" )
        (capturedOn ?movie ?date)
        </definition>
    </rule>
    ....
</ruleset>
```

| TEMPLATE RULE | REQUIRED METADATA AND/OR ALGORITHM |
|---|---|
| SELECT THEME (e.g. "VACATION," OR "PARTY") TO FIND APPROPRIATE ASSETS FOR STORY | USER REQUEST AND/OR EVENT CLASSIFICATION |
| ELIMINATE IMAGES WITH POOR QUALITY | IVI |
| PUT ASSETS IN CHRONOLOGICAL ORDER | DATE AND TIME STAMP |
| ELIMINATE DUPLICATE IMAGES | DUP DETECTOR |
| SELECT BEST OF SIMILAR IMAGES | IMAGE SIMILARITY, IVI |
| SELECT IMAGES FROM EACH LOCATION IN COLLECTION | GPS LOCATION DATA |
| SELECT BEST IMAGES OF EACH PERSON AT EVENT | PEOPLE RECOGNITION, IVI |
| SELECT IMAGES PROPORTIONATELY TO NUMBER OF OCCURRENCES OF PERSON | PEOPLE RECOGNITION |
| SELECT BEST OF GROUP SHOTS | PEOPLE RECOGNITION, IVI |
| SELECT APPROPRIATE MUSIC BASED ON THEME | EVENT CLASSIFICATION, MUSIC CLASSIFICATION, PERSONAL PROFILE/PREFERENCES |
| CHANGE MUSIC AS THEMES CHANGE WITHIN A SUBEVENT | EVENT CLASSIFICATION, MUSIC CLASSIFICATION, PERSONAL PROFILE/PREFERENCES |
| SELECT APPROPRIATE TRANSITIONS BASED ON THEME | EVENT CLASSIFICATION, PERSONAL PROFILE/PREFERENCES |
| SELECT APPROPRIATE BACKGROUND IMAGE BASED ON THEME | EVENT CLASSIFICATION, PERSONAL PROFILE/PREFERENCES |
| ADJUST DWELL TIME RELATIVE TO PICTURE SIGNIFICANCE | IVI, OTHER SIGNIFICANCE INDICATORS (FAVORITES, SHARED, PRINTED, ETC) |

FIG. 12

AUTOMATIC STORY CREATION USING SEMANTIC CLASSIFIERS FOR DIGITAL ASSETS AND ASSOCIATED METADATA

CROSS-REFERENCE TO RELATED APPLICATIONS

This application claims priority under 35 U.S.C. §120 as a continuation-in-part application of commonly owned related U.S. patent application Ser. No. 11/758,358; filed on Jun. 5, 2007 now abandoned; entitled: "Automatic Story Creation Using Semantic Classifiers For Images And Associated Metadata", by Catherine D. Newell et al.

TECHNICAL FIELD OF THE INVENTION

This invention pertains to multimedia authoring methods, systems, software, and product distribution media. In particular, this invention automatically generates a single-media or multimedia presentation based on a user's stored media files, thereby automatically producing a customized story for the user requiring minimal user effort.

BACKGROUND OF THE INVENTION

It is widely acknowledged that viewing images in the form of a single-media or multi-media thematic presentation, referred to herein as a "story," or a hardcopy thematic album is much more compelling than browsing through a number of random hard-copy prints, or looking at a random series of static images presented sequentially using a slide projector, computer, or television. The selective addition of other elements to the presentation such as a sound track appropriate to the content of the images, the insertion of interesting transitions between the images, the addition of video or of various video-style special effects including fades and dissolves, image-collaging, backgrounds and borders, and colorization makes the presentation much more interesting to the viewer and can greatly enhance the emotional content of the images being presented. The proliferation in the home of new television-based viewing platforms able to accommodate multimedia, including DVD, Video CD players, home media servers, and high definition digital displays also increases the demand for this type of story or presentation.

For the ordinary photographic consumer, the creation of a multimedia presentation or album of still images is not presently very easy or convenient. The selection and layout of digital image assets can be a significant and time-consuming process. Even if the images are available in digital form, a consumer must have facility with multimedia authoring software tools such as Macromedia Director™ or Adobe Premier™ in order to create such a presentation. These software tools, while very flexible, are aimed more at the professional presentation creator, have multiple functional options, and require a great deal of time and experience to develop the skill needed to use them to advantage. More recently, template-based multimedia presentation applications such as Photojam™, offered by Shockwave.com™, or PC-based "movie making" applications such as Apple's i-Movie™ have become available. While these applications can simplify the creation of multimedia presentations for a consumer, they do not help to automate many of the story making options. Current applications often require the user to select a presentation theme and to select the assets, such as pictures, video, and music; that are used to automatically generate an image product. In addition, these applications offer no way to automatically generate an image product such as for special occasions, holidays, anniversaries, or for selected other events or calendar dates.

Thus, there remains a need for an automated authoring system where an inexperienced user can receive an automatically generated single-media or multimedia story and obtain copies of the presentation over a variety of channels and in a variety of formats suitable for various types of presentation devices.

SUMMARY OF THE INVENTION

In answer to these and other needs, and in accordance with one preferred embodiment of the present invention, there is provided a method for automatically generating a customized story, image product, or presentation on a digital storage device of a set of digital media files provided by a user, comprising the steps of analyzing the digital media files for semantic information, including metadata, and organizing the digital image assets in association with a selected presentation format and on a medium that can be viewed by the user, the format automatically chosen in accordance with the semantic and metadata information, or pre-selected by the user or by the computer system.

Another preferred embodiment of the present invention is a method, software, and a programmed computer system for automatic story-creation from a collection of assets (still images, video, music, public content) utilizing prescribed template rules applied to the collection. The template rules rely on metadata associated with the assets, personal profile and/or user preference data acquired from the user. Metadata can be in the form of EXIF data, index values from image understanding and classification algorithms, GPS data, and/or personal profile/preferences. These rules, or a subset of them, when automatically applied to a collection within the system, will produce a story for rendering via a multimedia output engine. The story can be delivered to the user on a variety of storage media such as CDs, DVDs, magnetic discs, and portable flash memory media. The story can be transmitted via cellular networks, by satellite providers, or over local and wired area networks. The story can be received and viewed by the user on a variety of hand held display devices such as PDAs and cell phones. The story can be received at a home and displayed on a computer, television, or over theater style projection systems.

Another preferred embodiment of the invention comprises a method for automatically creating an image product comprising the steps of obtaining a plurality of digital media files associated with an event such as a birthday, holiday, anniversary, or other occasion. Classifying the event is accomplished based on analyzing the digital media files and automatically determining a format of an output product based upon the analysis, and then selecting which ones of the digital media files will be included in accordance with requirements of said output image product.

Another preferred embodiment of the invention comprises a program storage device storing a computer program for execution on a computer system. The program is capable of automatically generating an image product utilizing a number of digital media files that are resident in the computer system. The program is designed to first detect an image product trigger which might be a calendar date, a user request for an image product, or an upload to the computer system of a plurality of digital media files such as images, sound files, video, etc. The program locates a plurality of digital media files associated with an event if it is a calendar event, for example, or if the trigger is an upload of media files, the program will determine if the media files satisfy an output product format type. The program automatically classifies the plurality of digital media files based on analyzing metadata associated therewith and automatically selects those files, based on the classifying step, that satisfy an output product format type. The selected media files are ranked based on one or more of a variety of metrics, such as an image value index, and some or all of the ranked files are included in an appropriate image product format that is related to the event.

Other embodiments that are contemplated by the present invention include computer readable media and program storage devices tangibly embodying or carrying a program of instructions readable by machine or a processor, for having the machine or computer processor execute instructions or data structures stored thereon. Such computer readable media can be any available media which can be accessed by a general purpose or special purpose computer. Such computer-readable media can comprise physical computer-readable media such as RAM, ROM, EEPROM, CD-ROM, or other optical disk storage, magnetic disk storage, or other magnetic storage devices, for example. Any other media which can be used to carry or store software programs which can be accessed by a general purpose or special purpose computer are considered within the scope of the present invention.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

FIG. 2 illustrates example metadata elements that an embodiment of the invention might use to generate semantic relationships among product assets;

FIG. 3 illustrates an embodiment of a user interface for entering metadata associated with a person;

FIG. 7 illustrates program logic for implementing a portion of one embodiment of the present invention;

FIG. 12 illustrates examples of rules and the associated metadata and/or algorithms required to make them work.

DETAILED DESCRIPTION OF THE INVENTION

Figure 1:
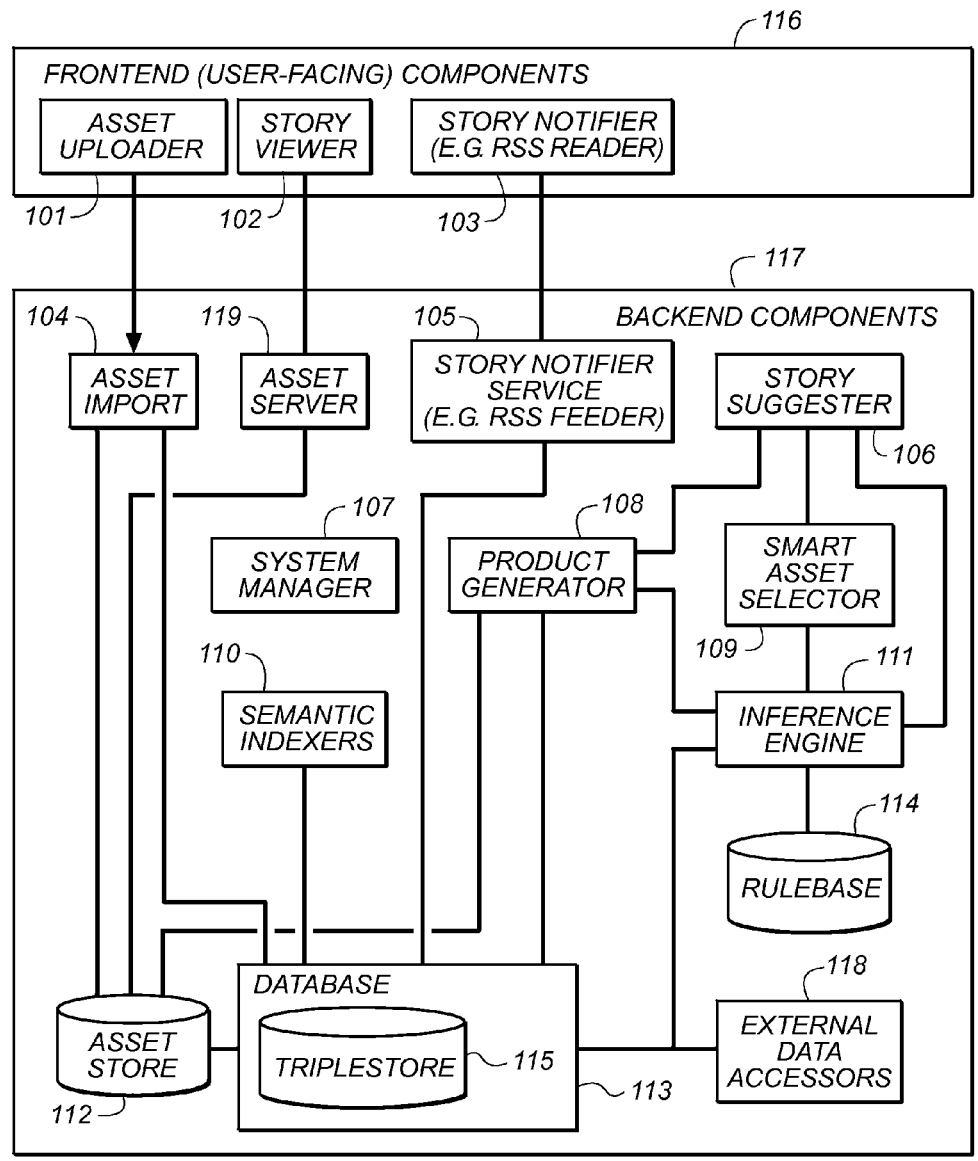
FIG. 1 illustrates some aspects of a computer system utilizing the present invention.

Overview:

With respect to FIG. 1, there are illustrated several basic computer system components that interact in a cooperative implementation for practicing the present invention. The top portion of the FIG. 116 represents an embodiment of the user interface components including an Asset Uploader 101, Story Viewer 102, and Story Notifier 103. The Asset Uploader 101 is used for uploading media assets such as still pictures, photos, audio, video, images, graphics, music, as examples. Digital assets may be represented as files of various types and formats such as JPEG, GIF, MPEG, for example. Digital media assets can be uploaded from asset capture devices such as digital cameras, cell phones, multi-function hand-helds, scanners, recording apparatuses, etc. These devices can be connected manually to the computer for uploading, or they may communicate to the computer over a wireless protocol, or the devices might remain attached to the computer during asset capture since many computers can be equipped with microphones and cameras, etc. Assets can also be downloaded from a network, such as the Internet, and stored on the computer.

The story viewer 102 can be used for viewing an image product or other media assets on a monitor or other display apparatus coupled to the computer system, and may include capabilities for editing media assets. Numerous computer implemented image-editing applications are well known in the art, and are not described further herein. Although it is referred to as a story viewer, audio playback of digital audio assets can also be included in the story viewer, wherein the playback can occur simultaneously with, or separately from, viewing image assets.

The story viewer can utilize a computer system connection to a network, such as an Internet connection, for sending or receiving completed multimedia stories to and from another computer system. It can also utilize a network connection for sending completed stories or other media asset collections over a cell network to a hand held device such as a multimedia capable cell phone or PDA, or to a printer for printing a story. One of the distinctive features of the present invention is a selection algorithm, which automatically selects and sequences media assets.

A story notifier 103 is used for automatically notifying a user that an image product has been generated by the system. The story notifier can send notices over a network to another computer, utilize a computer system connection to an RSS feed for sending notifications that a story has been generated, or over a cell network to a hand held device such as a cell phone or PDA. In the latter instance, an SMS (Short Messaging System) protocol can be implemented on the computer system. The computer system can also be programmed to notify a user via a display screen message or by an audio signal. A user can also access the story notifier to forward notifications to another device using any of the above means.

Although FIG. 1 shows examples of types of computer system components suitable for implementing the present invention—one based upon the client-server paradigm—the reader will appreciate that the system components may be structured in other ways without fundamentally altering the present invention. In particular, the illustrated system components may all be resident on the same host system, or they may be distributed across a large or small computer network among different hosts in a number of ways, as in a distributed computer system. For example, the story notifier, asset uploader, asset store, etc, can each be resident on one or more separate host systems coupled over a LAN or WAN. Moreover, each of these host systems might be operated by one or more service providers, each offering specialized services and charging a fee. The functionality described herein may reside on an appliance such as a home media server, which itself might communicate to one or more online services such as the Kodak Gallery™.

The bottom portion of FIG. 1 117 illustrates the backend components of the computer system. In a preferred embodiment, the backend system components 117 pass information amongst themselves via an intermediary database 113. Such a database may be configured in a variety of ways via partitioning, replicating, etc. The database may be owned by different persons or accessed only via user account passwords. Access might be provided through public kiosks. It will be appreciated by those skilled in the art that other communication paradigms, including system buses, network packets (Internet and cell networks), message passing, and publish-subscribe may also be used. Moreover, the backend components 117 may be shared by multiple users, as is typically the case with web-based services for Internet connected devices. In such a preferred embodiment, the asset store 112 and the database 113 will contain assets and information from multiple users. Typically, the asset store will contain assets and the database will contain metadata.

With reference to the front-end user interface, the user introduces selected assets into the system database by activating the asset uploader 101. This component then communicates with the asset import 104 component. The asset import functions to store copies of the assets into the asset store 112 and informs the system manager 107 that it has completed the upload. The asset import component can be located on the computer system or it may be located on a server connected to a computer locally or over a network. In one preferred embodiment, communication between the asset import and system manager occurs via the database 113, however, each of the back-end components can be implemented to communicate directly with the system manager 107. For ease of illustration, FIG. 1 does not show connection lines between the system manager 107 and the various other back-end system components, however, the components 104-106, 108-110, 112-113, and 115 are all coupled to the system manager. The system manager 107 initiates the semantic indexing process via Semantic Indexer Utilities 110, whereby, various semantic information is extracted, or derived, from the uploaded assets' metadata and stored in the database 113. For example, these semantic indexing algorithms can include scene classifiers to categorize a scene depicted in an image asset into one or more scene types (i.e., beach, indoor, outdoor, etc.), face detection to determine the presence of faces in images, and face recognition to identify a person in an image using facial features. The derived information is stored as metadata with the corresponding image asset. People recognition is the identification of a person using facial features and/or other contextual information such as clothing identification. The indexers 110 also include event segmentation algorithms that automatically sort, segment, and cluster an unorganized set of assets into separate events and sub-events.

The semantic indexers 110 include metadata extraction mechanisms for extracting metadata already included in the digital asset, such as embedded by a digital camera, as explained above, and recording it in the database. Other examples of such metadata include the capture date and time, among many other examples as described herein. The indexers can also include complex algorithms that analyze stored assets to generate more complex metadata. A preferred embodiment of the present invention sequences the operation of various semantic indexers that organize a set of media assets because some of the indexers may rely on the output of other indexers for their operation. Such ordering would be managed by the System Manager 107 or it may be sequenced via a table lookup for a strict ordering scheme, or it may be stored in a dependency tree or other suitable data structures. All of the generated metadata are recorded in the database 113 and are appropriately associated with their corresponding media asset. In a preferred embodiment, any of the metadata may be stored in the triplestore 115, a type of database optimized for storing large quantities of unstructured data.

When the last semantic indexer has completed, or at least a sufficient number of pre-selected indexers have completed, the system manager 107 will activate the story suggester 106 to determine if one or more appropriate stories should be created, which, if so determined, will cause the generation of an image product or story. The story suggester, in turn, will activate the inference engine 111 to evaluate the various rules stored in the rule base 114 to determine if any of the story rules stored therein can be satisfied by a current collection of media assets. This is referred to as an event based trigger for story generation. Other types of programmable triggers might include monitoring for an upload of assets by a user. For example, if a user has uploaded a number of assets the story suggester will begin to analyze the assets to generate a possible story if the inference engine determines that a sufficient number of story rules have been satisfied. One preferred embodiment of the inference engine is the Prolog inference engine having the rule base 114 represented as a set of Prolog clauses organized into sets of named rules stored in an XML file and evaluated by the Prolog engine as requested. Prolog is a declarative logic programming language used as explained in detail below.

When the story suggester is searching for stories to create based upon a date based trigger, such as an anniversary, holiday, birthday, or other event, the story suggester 106 requests that the inference engine 111 evaluate the Prolog clause suggestStoryByEvent, looking for valid bindings for several free variables including, but not necessarily limited to, the user, the story type, the intended recipient, and the product type. If a valid set of variable bindings is identified (such as by the Prolog inferencing engine), the story suggester will then obtain from the smart asset selector 109 the appropriate set of assets to go with the suggested story, and then request that the product generator 108 create the desired product representation which may include a photo album, or rendering an image on a mug or on a T-shirt. The product generator will create one or more files of the appropriate format representing the image product, which may include instructions to be sent over a network to a product maker if the image product so requires. The product generator may store the resulting file(s) in the asset store 112 enabling the resulting product to be treated as another asset in the user's collection. If there are only a small number of assets that satisfy a story rule, it may be determined to make a mug or other product containing a single image or small number of images. The system manager 107 is notified by the product generator when the image product has been generated, at which point the system manager alerts the story notifier service 105, which in turn causes the story notifier 103 to inform the user that a new product, or product preview, has been created. In addition to the notification methods described earlier, the notification may be in the form of a pop-up window on a display containing text and graphics information indicating that an image product has been created and is ready for viewing. The user may then view the product using the story viewer 102. The story viewer may be implemented as a browser such as Internet Explorer, or a video playback device such as Windows Media Player. In a preferred embodiment, the user has the option to request from the story viewer that the product be sent to a printer for a hardcopy rendition of the product, such as a bound photo album, if appropriate. The user may also request that a mug, for example, be produced and delivered. Such an implementation requires that an order screen be presentable to the user to provide contact information for a fulfillment provider, which may include a direct link to a provider website, and to obtain a user's delivery request information. To display the product, the story viewer requests and obtains the necessary assets from the asset store 112.

The system manager may also launch the story suggester on a periodic basis, such as nightly, or monthly, or some other period, to determine if a calendar event driven story can be created from digital media files stored on the computer system. This can optionally be driven by an upcoming event based on a time window selected by the user. The reader will appreciate that alternative architectures may result in fundamentally the same behavior. For example, the story suggester 106 and smart asset selector 109 components may be combined into a single component, or the story suggester may directly invoke the smart asset selector to determine that the appropriate set of assets are available for a particular story. In suggesting and creating stories for a particular user, the story suggestor and smart asset selector may consider only assets and metadata owned by that user, or they may consider all assets in the system to which the user has access, including assets that other system users may have shared with the user. FIG. 1 illustrates a database for storing at least some subset of the metadata in the database 113 in a separate type of database known as a triplestore 115, but other types of databases, or combinations thereof, including relational databases, may also be employed. Some metadata may be obtained from third-party sources, which function would be performed by external data accessors 118 having access to external networks such as the Internet. These types of data can be also gathered from personal calendar entries, based on user usage patterns, or by monitoring user participation in web based interactions with other persons.

Metadata:

Metadata encompasses data that is stored and associated with a media asset. In general, by way of example and not by limitation, there are three sources of metadata: capture device metadata, such as time, date, and location provided by a digital camera; user provided metadata such as via a capture device user interface or an image editing application interface; and derived metadata such as by face recognition or scene classification applications. Derived metadata also includes metadata deduced from existing metadata of any type. Metadata can be generated at the time of storing files on a computer of captured image data. Metadata can be generated automatically by a capture device or entered manually into storage by a user at the time of capturing an image, for example. It can also be generated automatically without a user's knowledge by programmed operation of image recognition software. Such software may be capable of generating many levels of metadata based on extrapolating existing metadata information. For example, a family tree may be inferred given sufficient existing metadata for known family members who are depicted in stored image media collections.

With reference to FIG. 2, there is illustrated a list of example metadata elements that may be used by the present inventive system. Temporal event clustering of stills and videos 201, 202 is generated by automatically sorting, segmenting, and clustering an unorganized set of media assets into separate temporal events and sub-events, as described in detail in commonly assigned U.S. Pat. No. 6,606,411; entitled: "A Method For Automatically Classifying Images Into Events"; issued on Aug. 12, 2003, and commonly assigned U.S. Pat. No. 6,351,556; entitled: "A Method For Automatically Comparing Content Of Images For Classification Into Events"; issued on Feb. 26, 2002. Content-based Image Retrieval (CBIR) 203 retrieves images from a database that are similar to an example (or query) image, as described in detail in commonly assigned U.S. Pat. No. 6,480,840; entitled: "Method And Computer Program Product For Subjective Image Content Similarity-Based Retrieval"; issued on Nov. 12, 2002. Images may be judged to be similar based upon many different metrics, for example similarity by color, texture, or other recognizable content such as faces. This concept can be extended to portions of images or Regions of Interest (ROI). The query can be either a whole image or a portion (ROI) of the image. The images retrieved can be matched either as whole images, or each image can be searched for a corresponding region similar to the query. In the context of the current invention, CBIR may be used to automatically select assets that are similar to some other automatically selected asset. For example, Valentine's Day themes might need to find images with a predominance of the color red, or autumn colors for a Halloween theme. Scene classifiers identify or classify a scene into one or more scene types (e.g., beach, indoor, etc.) or one or more activities (e.g., running, etc.). Example scene classification types are listed at 204, and details of their operation are described in U.S. Pat. No. 6,282,317; entitled: "Method For Automatic Determination Of Main Subjects In Photographic Images"; U.S. Pat. No. 6,697,502; entitled: "Image Processing Method For Detecting Human Figures In A Digital Image Assets"; U.S. Pat. No. 6,504,951; entitled: "Method For Detecting Sky In Images"; U.S. Patent Publication No. US2005/0105776; entitled: "Method For Semantic Scene Classification Using Camera Metadata And Content-Based Cues"; U.S. Patent Publication No. US2005/0105775; entitled: "Method Of Using Temporal Context For Image Classification"; and U.S. Patent Publication No. US2004/003746; entitled: "Method For Detecting Objects In Digital Image Assets." A face detector 205 is used to find as many faces as possible in image collections, and is described in U.S. Pat. No. 7,110,575; entitled: "Method For Locating Faces In Digital Color Images", issued on Sep. 19, 2006; U.S. Pat. No. 6,940,545; entitled: "Face Detecting Camera And Method"; issued on Sep. 6, 2005; U.S. Patent Publication No. 2004/0179719; entitled: "Method And System For Face Detection In Digital Image Assets"; filed on Mar. 12, 2003. Face recognition 206 is the identification or classification of a face to an example of a person or a label associated with a person based on facial features as described in U.S. patent application Ser. No. 11/559,544; entitled: "User Interface For Face Recognition"; filed on Nov. 14, 2006; U.S. patent application Ser. No. 11/342,053; entitled: "Finding Images With Multiple People Or Objects"; filed on Jan. 27, 2006; and U.S. patent application Ser. No. 11/263, 156; entitled: "Determining A Particular Person From A Collection"; filed on Oct. 31, 2005. The prior art references listed in this paragraph are hereby incorporated by reference in their entirety.

Face clustering uses data generated from detection and feature extraction algorithms to group faces that appear to be similar. As explained in detail below, this selection may be triggered based on a numeric confidence value. Location-based data 207, as described in U.S. Patent Publication No. US2006/0126944; entitled: "Variance-Based Event Clustering"; filed on Nov. 17, 2004; can include cell tower locations, GPS coordinates, and network router locations. A capture device may or may not include metadata archiving with an image or video file; however, these are typically stored with the image as metadata by the recording device, which captures an image, video or sound. Location-based metadata can be very powerful when used in concert with other attributes for media clustering. For example, the U.S. Geological Survey's Board on Geographical Names maintains the Geographic Names Information System, which provides a means to map latitude and longitude coordinates to commonly recognized feature names and types, including types such as church, park or school. Item 208 exemplifies identification or classification of a detected event into a semantic category such as birthday, wedding, etc. as described in detail in U.S. Patent Publication No. US2007/0008321; entitled: "Identifying Collection Images With Special Events"; filed on Jul. 11, 2005. Media assets classified as an event can be so associated because of the same location, setting, or activity per a unit of time, and are intended to be related, to the subjective intent of the user or group of users. Within each event, media assets can also be clustered into separate groups of relevant content called sub-events. Media in an event are associated with same setting or activity, while media in a sub-event have similar content within an event. An image value index ("IVI") 209 is defined as a measure of the degree of importance (significance, attractiveness, usefulness, or utility) that an individual user might associate with a particular asset (and can be a stored rating entered by the user as metadata), and is described in detail in U.S. patent application Ser. No. 11/403, 686; filed on Apr. 13, 2006; entitled: "Value Index From Incomplete Data"; and in U.S. patent application Ser. No. 11/403,583; filed on Apr. 13, 2006; entitled: "Camera User Input Based Image Value Index"). Automatic IVI algorithms can utilize image features such as sharpness, lighting, and other indications of quality. Camera-related metadata (exposure, time, date), image understanding (skin or face detection and size of skin/face area), or behavioral measures (viewing time, magnification, editing, printing, or sharing) can also be used to calculate an IVI for any particular media asset. The prior art references listed in this paragraph are hereby incorporated by reference in their entirety.

Video key frame extraction 210 is the process of extracting key-frames and/or a salient shot, scene, or event, and the associated audio to provide a summary or highlight of a video sequence, and is described in detail in U.S. patent application Ser. No. 11/346,708; entitled: "Extracting Key Frame Candidates From Video Clip". EXIF data 211 (Exchangeable Image File format for digital still cameras: EXIF Version 2.2, JEITA CP-3451, Japan Electronics and Information Technology Industries Association, April 2002) is data generated by a recording device and is stored with the captured media file. For example, a digital camera might include various camera settings associated with an image such as f-stop, speed, and flash information. These camera-generated data may also include GPS data indicating geographic location related to where an image was captured. All metadata, whether input by a user, provided by a recording apparatus, or inferred by a computer system can be used by the programmed computer system to generate additional metadata based on inferences that can be determined from existing metadata. The prior art references listed in this paragraph are hereby incorporated by reference in their entirety.

Figure 3:
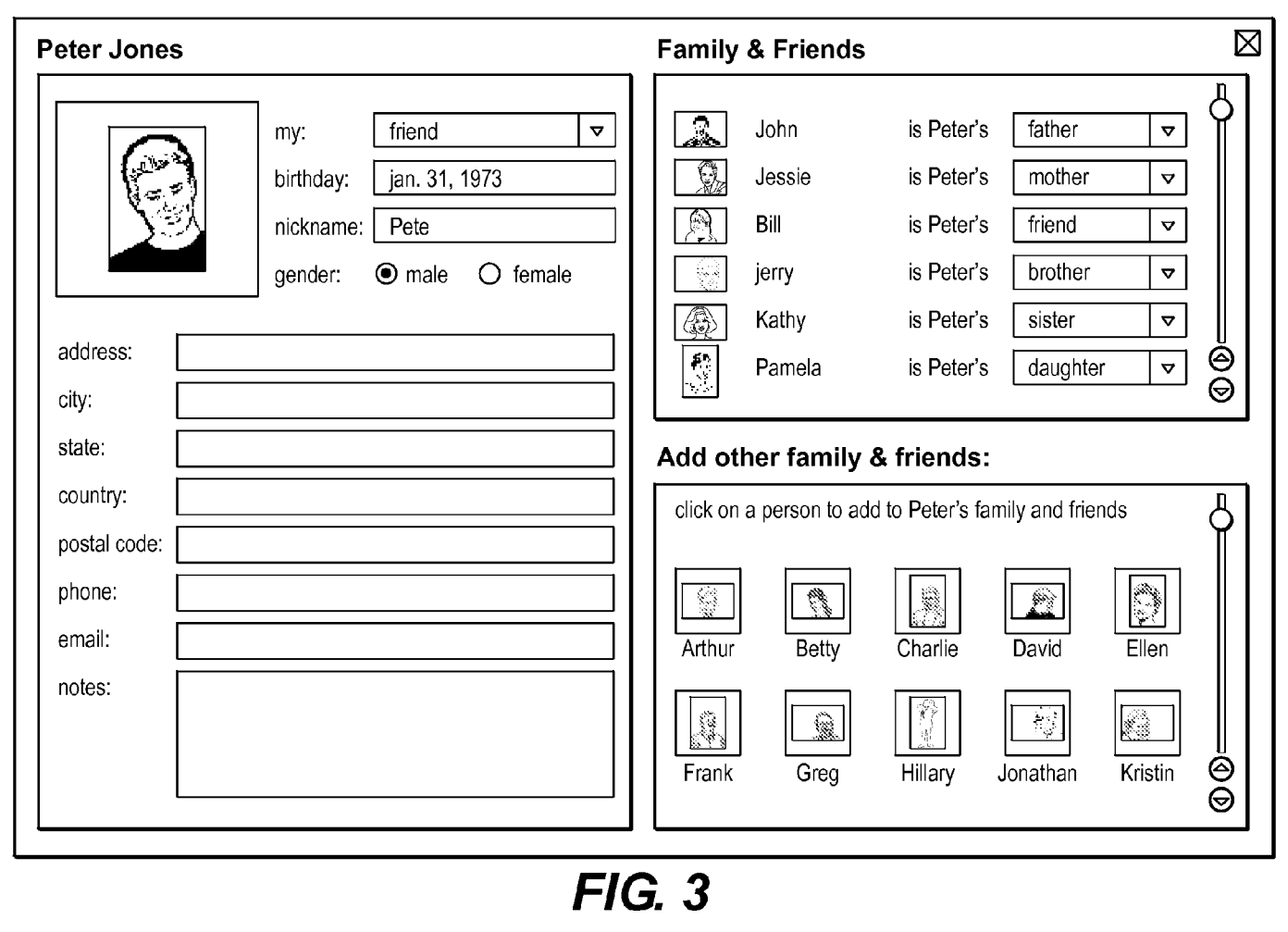

With reference to FIG. 3, there is illustrated an example computer system user interface (UI) for entering profile metadata related to a person "Peter Jones". This mode of user metadata entry can be implemented for any media asset in a collection. Information fields that can be entered by a user via a keyboard, for example, in this UI include personal information for the person such as address, city, state, country, phone, email address, and other notes. The notes might include keywords such as nicknames, profession, physical characteristics, or any other input data, which the computer system will use to associate with the person "Peter Jones". Personal information may also include a list of personal interests, hobbies, and commonly engaged-in activities. To enable the system to better interpret such interests, the user interface may constrain the set of possible choices, allowing the user to select multiple classes of interests and hobbies from a hierarchically structured interest and activity ontology. Such ontologies may be developed specifically for the present invention alternatively a publicly available ontology may be used or adapted for this purpose. For example, the "Integrated Public Sector Vocabulary", published by the British government, includes, among other things, a hierarchical and structured list encompassing sports, religious beliefs, hobbies and other leisure activities. The computer system may be programmed to allow the user to enter such interests in a free-form manner, with the computer system enabled to recognize certain keywords and map them to the corresponding ontological terms.

This user profile also includes information about people related to "Peter Jones" such as family and friends, which will also be associated by the program with the profiled person. The depiction of user input information related to a person should not be limited only to the examples illustrated in FIG. 3. Related information which is associated with the person may also include information about past and present friends, co-workers, family, and other people associated with the person; places of residence and places visited; and possessions including vehicles, clothing, musical instruments, etc., as well as pets and livestock, for example. Each such piece of related information, or metadata, about the person may in turn have associated metadata, such as: name, birth date, date acquired, usage information, and other representative pictures.

For familial relationships, the system does not require that the user enter all family relationships—one does not need to say, for example, that Jane is Ann's daughter, that Jane is Mary's grandchild, that Jane is Bill's niece, etc. Instead, the system requires only that the canonical relationships of spouse, and parent/child be entered; all other familial relationships can be automatically inferred by the system. Relationships by marriage can likewise be inferred, such as mother-in-law. The system can provide a way for the user to specify that such a relationship has terminated as a consequence of divorce, for example.

Figure 4:
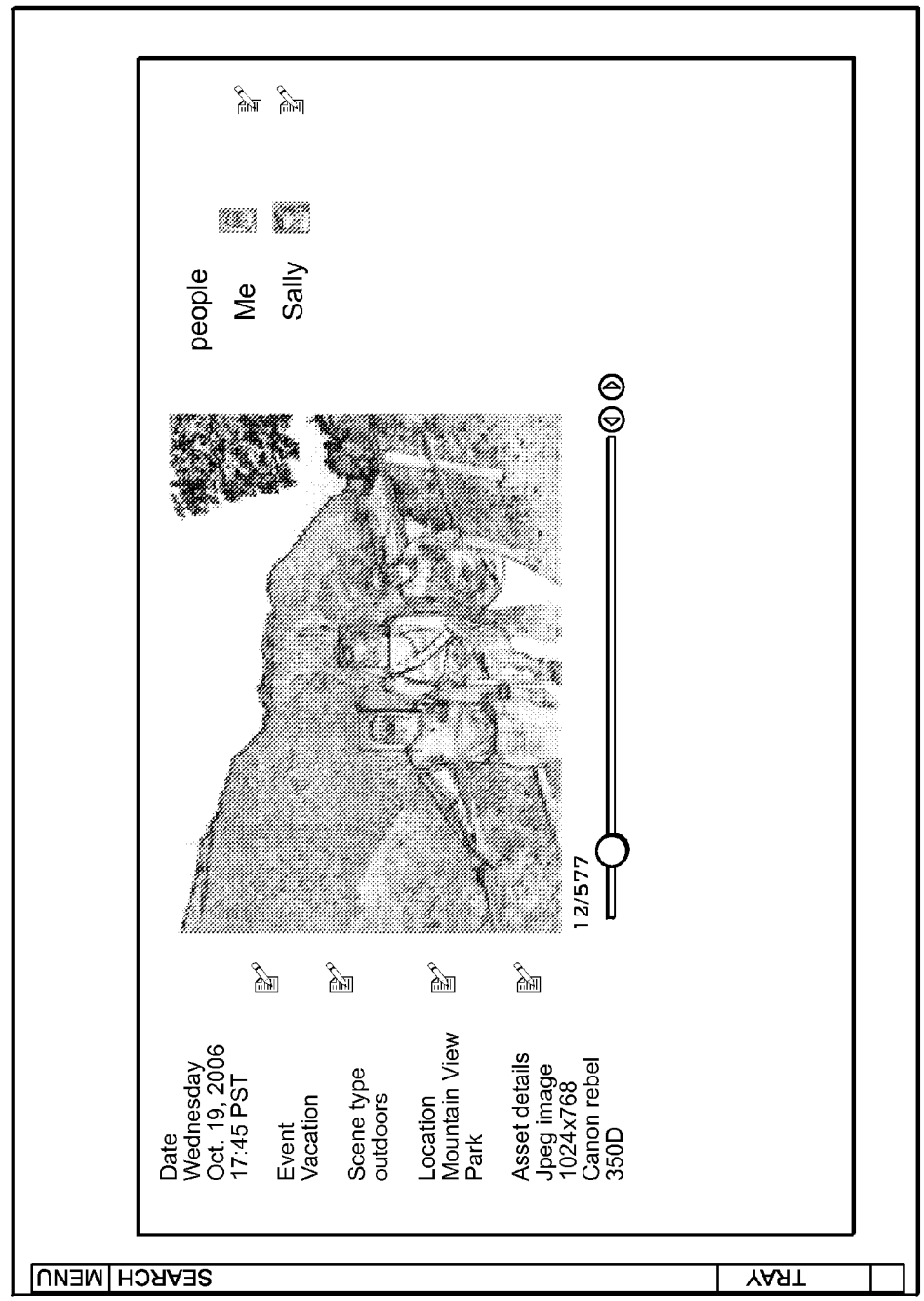
FIG. 4 illustrates an embodiment of a user interface for entering metadata associated with an image.

With reference to FIG. 4, there is illustrated an example user interface for entering metadata related to, for example, an image stored on the computer system database 113 of FIG. 1. Information fields in this UI include those which are associated with the image, or a person, place, animal, or thing depicted in the image, and may also include information about other persons, places, things, animals, etc., which appear in the image. These fields include date information, an event field for describing an event related to the image, and keywords entered by a user for facilitating a semantic inference with the image for searching purposes. A location field for describing a location related to the image, and an asset detail field also assist, in compiling various types of metadata related to the image. The information fields might also include data unrelated to anything depicted in the image. Rather, the information may include contextual information. For example, if the image includes scenes from a soccer match an information field might state that the game was lost, or it may include information about who was coaching the team on that day, or it may include information about the weather (which can be obtained automatically by program generated metadata utilizing information available online together with EXIF data such as GPS location and time and date) or information about events preceding or following the match, and other data of unlimited variety entered by a user that the programmed computer system associates with the stored image. Keywords may be added in the keyword field to facilitate searching for images. Facial recognition tools may be implemented to assist in generating metadata by automatically identifying persons depicted in the image for which information is already stored based on those persons appearing in another image stored in the database. For example, if a chain of relationships can be inferred based on family relationship metadata available for a group of persons, it may be possible for the system to automatically generate a family tree.

Some metadata may be obtained from third-party sources, such as weather or calendar services, as performed by external data accessors 118. For example, it may be useful in constructing a story to know what the weather was like a given day in a given location. The date and time information, combined with the GPS information recorded in an EXIF file may be provided as input to an external web service providing historical weather information. Location information together with date information can identify an event or a likely special interest. Alternatively, such information may be provided to a service describing events, enabling the system to know, for example, what happened at a stadium on a particular date.

General Algorithm:

A preferred embodiment of the present invention includes an algorithm that automatically checks whether required components for a story exist in a user's media database. Any programmable event may be used to trigger an evaluation of a media database for the possibility of a story creation. An upload of one or more media files can initiate a check for automatic story creation. A periodic calendar date or an approaching anniversary or holiday can trigger a check of media assets for use in a story product. The significance of a particular calendar date can be inferred based on the frequency and type of user activity during time periods surrounding the calendar date. A user's preferred activities can also be inferred from analyzing his or her media assets, or by tracking a frequency of how often particular types of assets are accessed. The ways in which a user's media assets, and the user's interaction with those assets, can be analyzed is virtually unlimited. The embodiments described herein are not meant to restrict the present invention to any specific embodiment.

With respect to a recurring date, such as a holiday, an example algorithm for suggesting a Mother's Day story for a particular user in a preferred embodiment can be expressed in the Prolog computer language. It has an English equivalent as follows:

R-1. Given target date Date, suggest to user User story type "Mother's Day Album" and product "Mother's Day Multimedia Album" intended for recipient Recipient if:
    R-1.1. Target date Date is a known recurring holiday Holiday
    R-1.2. The Holiday is Mother's Day
    R-1.3. The system user User is the spouse of the recipient Recipient
    R-1.4. The recipient Recipient is a mother The above rule depicts a high level rule used to determine whether a particular story product should be created for a particular user. It should be noted at this point that those skilled in the art will recognize the virtually unlimited number of rules that can be programmed to implement the present invention. If the rule above is satisfied, then a Mother's Day story type is used for the next step in story creation.

The story type defines a set of rules used to pick the assets to use to make a particular story product. The smart asset selector 109 executes the rule set requested by the story suggester 106 to determine the appropriate set of assets for the story product being created. In the preferred embodiment, the rules making up a rule set are expressed in Prolog, using a version of Prolog where clauses are written in a parenthesized prefix form known as S-expressions. FIG. 7 contains a subset of the rules for the Mother's Day Album; a more complete set of rules might be expressed in English as follows:

R-2. Select assets satisfying the following constraints:
    R-2.1. Begin with at most the two best pictures of the mother alone, shown as the rule 701.
    R-2.2. Next, at most the best three pictures of the mother with all children (no husband), shown as rule 702.
    R-2.3. Next, the best picture of the mother with each child individually from any year, shown as rule 703.
    R-2.4. Best pictures of the mother with her mother from any year (not shown).
    R-2.5. Best pictures of the mother with family (children and husband) from past year (not shown).
    R-2.6. Finally, at most two video clips, shown as rule 704, where the video belongs to an event classified as type "Family Moments" and the video is less than 60 seconds in length.

"Best" may be defined according to a variety of programmed metrics, or a combination thereof, including various image value index (IVI) metrics. These criteria can be extended to other types of dates besides holidays. The above rules are merely exemplary; the Prolog language enables an arbitrary set of constraints to be defined. In a preferred embodiment, the exact definition of best is defined using additional Prolog clauses.

Figure 6:
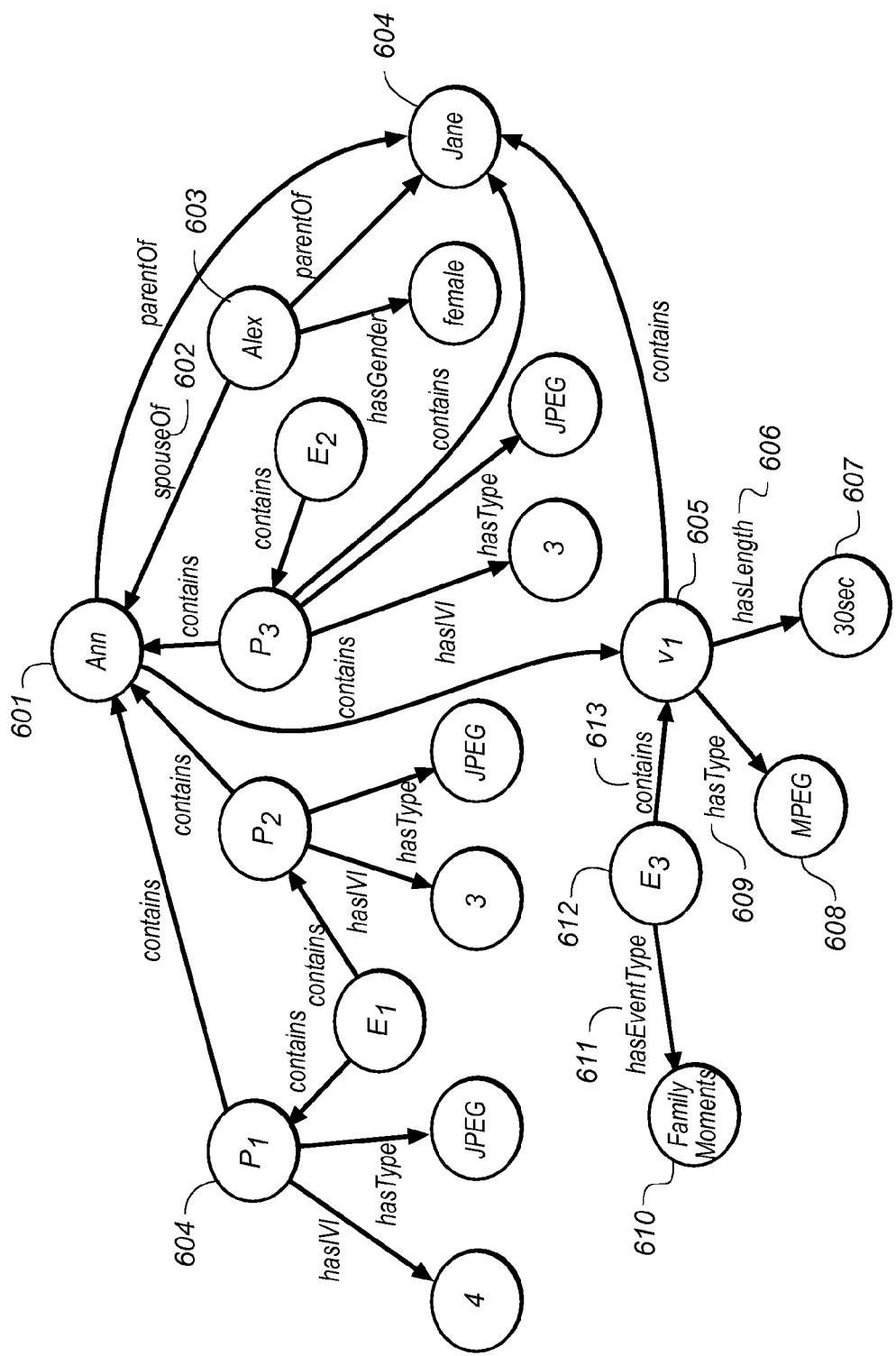
FIG. 6 illustrates a second example semantic network utilized by an embodiment of the present invention.

FIG. 6 illustrates a semantic network database containing an exemplary portion of the data associated with the example rule set above. In one preferred embodiment, the data are represented as a semantic network using the Resource Description Framework (RDF) data model. Within RDF, each "fact" is represented as a statement of the form "subject-predicate-object". The subjects and objects are illustrated as nodes and the predicates are shown as labeled links connecting the nodes. Subjects and predicates are denoted by Universal Resource Identifiers (URIs), identifying certain entities or concepts. Objects may be denoted by either universal resource identifiers or by literal values. For ease of exposition, the name of the entity is used here rather than the assigned universal resource identifier. For example, the fact "Ann is the spouse of Alex" is represented by the combination of the "subject" node 601, the labeled "predicate" link 602 and the "object" node 603. The entire set of data, including metadata associated with assets, user profile information, and auxiliary data is stored in a triplestore, a database optimized for storage of otherwise unstructured facts of the form subject-predicate-object. The reader will appreciate that other data models and storage mechanisms may be usefully employed to implement the present invention and that the invention is not limited to the exemplary embodiments described herein.

The story suggester 106 requests that the smart asset selector compute the set of assets matching the rule set "Mother's Day Album." The smart asset selector 109 in turn requests that the inference engine 111 execute the associated rules stored in Rulebase 114, determining which assets satisfy the constraints specified by the rules. Continuing the previous example, given the rule set 2 as the rule set "Mother's Day Album", which is shown in part in FIG. 7 in its native Prolog form, and given a set of data including the subset illustrated in FIG. 6, the smart asset selector will return the set of pictures and videos that satisfy the specified constraints. As a specific example, rule 2.6, indicated in FIG. 7 as the code within box 704, references the unbound variables ?movie and ?date, as shown on the first line in the definition section of the rule. This rule may be satisfied by binding ?movie to the URI associated with the asset V1 (605), and ?date to the literal value corresponding to the date the asset V1 was captured. This binding satisfies the rule because V1 belongs to an event E3 (node 612 and link 613) classified as being of type "Family Moments" (610, 611) and the video is less than 60 seconds in length (606, 607).

A satisfied rule set will specify a number of assets, if they exist. It's possible that an asset store will contain no assets satisfying a rule set. In that event, a default selection algorithm can be programmed to select available assets if a story product must be generated. A rule set may require the rule set, or its constituent rules, to match a minimum number of assets; if insufficient assets are present, then the story product is not created. A rule set may also specify further constraints on the assets that must be adhered to by the product generator. For example, a rule set may specify a sequence that the assets must follow in the final product and/or how the assets are to be grouped. The scope of the present invention includes all such embodiments.

Another preferred embodiment of the present invention is in the form of an event driven story type. This story type is triggered based upon an event. For example, an upload of assets to the computer system can be a triggering event. In one embodiment, the system, upon receipt of a set of assets, attempts to classify those assets as belonging to one or more event types. The system combines this event classification with additional information about the user to suggest a particular story type. In general, the programmed computer system includes the following routines for generating a story product for this event type:
 An interest and activity ontology.
 A product catalog ontology, which associates specific product types with specific interests or activities.
 The ability to associate with people interests or activities from the interest and activity ontology.

The interest and activity ontology defines an extensible list of possible activities, interests and hobbies. For example, a subset of the ontology may include the following classes:
(1) Sporting Activities
　1.a) Indoor Sports
　　1.a.1) Team Sports
　1.b) Outdoor Sports
　　1.b.1) Team sports
　　　1.b.1.a) Baseball
　　　1.b.1.b) Soccer
　　　1.b.1.c) Football
(2) Social Gatherings
　2.a) Parties
　　2.a.1) Wedding parties
　　2.a.2) Birthday parties
　　2.a.3) . . .
　2.b) Solemn Occasions A full ontology class can be scaled to contain an arbitrary amount of information. The computer system, upon uploading of a set of assets, for example, a series of photos from a digital camera, attempts to first group those assets into events using the event classifier, described above, and then classify the events according to the interest and activity ontology. In one preferred embodiment, the programmed computer system classifies assets belonging to one of the following example high-level event types 208:
 Outdoor Sports
 Party
 Family Moments
 Vacation These event types are selected because images can be categorized into these four categories using metadata analysis. These categories can be mapped to one or more classes from the previous activity and interest ontology. For example, the event type Outdoor Sports is mapped to the item 1.b Outdoor Sports in the ontology.

The product catalog likewise contains a set of possible product types, along with the activities/interests those products may be associated with:
 Baseball Album (goes with baseball)
 Soccer Album (goes with soccer)
 Baseball DVD (goes with baseball)
 Using this data, a preferred embodiment of the invention can implement the following generalized rule:
R-3. For a given event featuring a particular person, if the person has a specific interest that matches a specific product, and that interest is an instance of the high-level classification that is associated with that event, then give the person that product.

Given the above, the system can suggest a themed story based upon an upload of a set of digital media assets. For example, suppose a father uploads a set of pictures from his daughter Jane's recent little league game, and the system knows the following information:
 Jane likes baseball, known because either the system was explicitly told this by the user, or because the system was able to infer this information.
 The baseball product is associated with the activity baseball, known because the manufacturer or vendor of the product has associated that metadata as part of the product description.
 Baseball is a type of outdoor sport, which is a type of sport, known from an ontology of activities and interests that the system has been explicitly told, such as in the previous interest and activity ontology.

The specific algorithm for picking a story based on automatically selecting a theme associated with a set of pictures is as follows, in one preferred embodiment:
R-4. For a set of assets comprising a given event Event, suggest product Product for user User if:
　R-4.1. User owns event Event
　R-4.2. Event has classification EventType
　R-4.3. Event contains picture(s) featuring Person
　R-4.4. User is a parent of Person
　R-4.5. Person likes activity ActivityType
　R-4.6 Product goes with activity ActivityType
　R-4.7 Activity is a subclass of EventType This rule, along with many other such rules, is stored in the rule repository 114 and is executed by the inference engine 111 when requested by the story suggestor 106.

Figure 5:
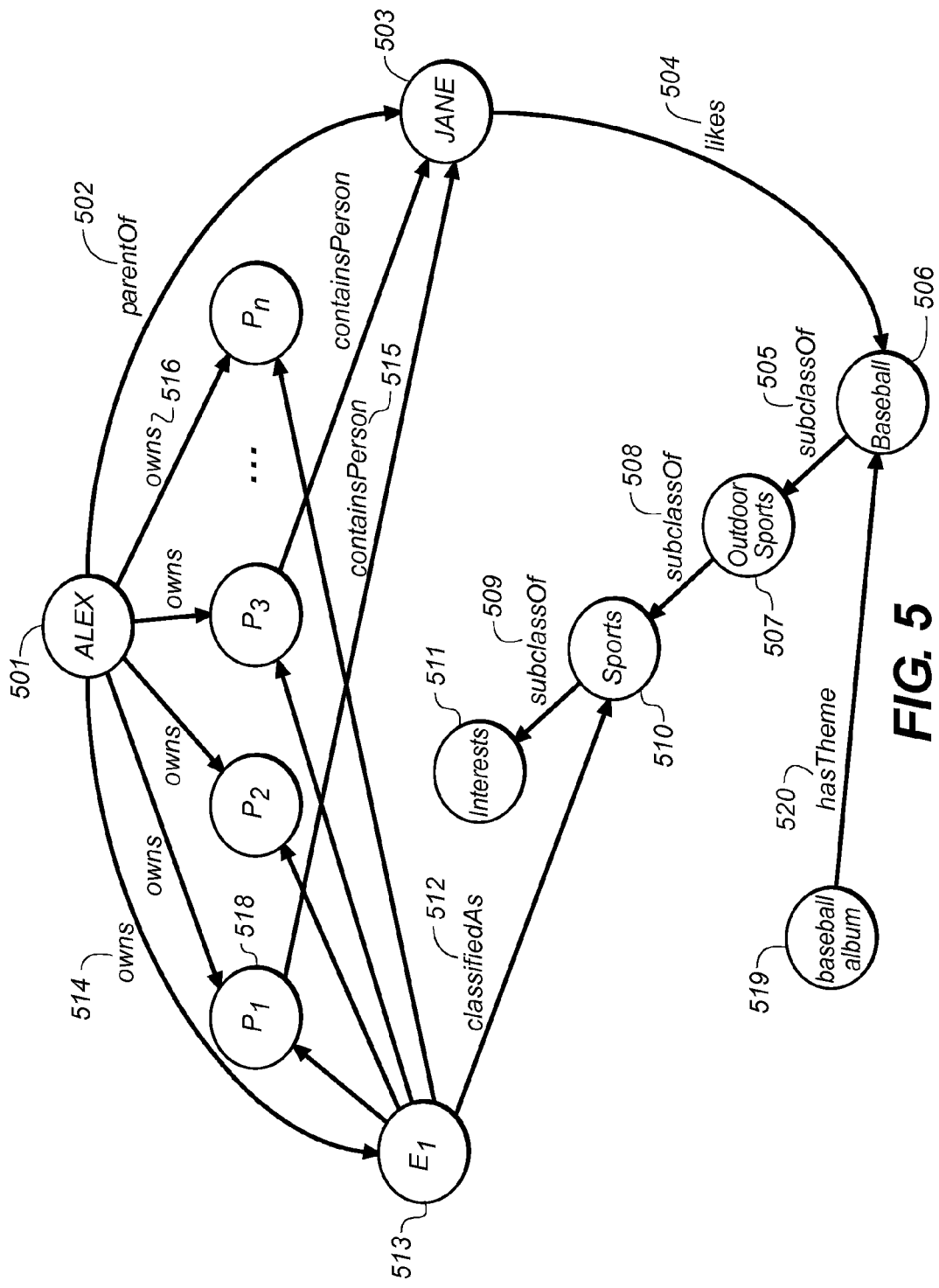
FIG. 5 illustrates an example semantic network utilized by one embodiment of the present invention.

With reference to FIG. 5 there is illustrated a semantic network database containing an exemplary portion of the data associated with the above example. The subjects and objects are illustrated as nodes and the predicates are shown as labeled links connecting the nodes. For example, the fact "Jane likes baseball" is represented by the combination of the "subject" node 503, the labeled "predicate" link 504 and the "object" node 506. The entire set of data, including metadata associated with assets, user profile information, and auxiliary data is stored in a triplestore. The reader will appreciate that other data models and storage mechanisms may be usefully employed to implement the present invention and that the invention is not limited to the exemplary embodiments described herein.

The previously described inference engine 111 of FIG. 1 executes rule 4 with respect to the set of data shown in FIG. 5 as follows. The inference engine is searching for a set of variable bindings for user User and product Product such that the constraints defined by rule 4 hold. Rule 4 consists of several sub-clauses 4.1 through 4.7, which in turn reference intermediate variables EventType, Person and ActivityType that must also simultaneously be bound to valid values such that the entire rule is true.

Event $E_1$ 513 is owned by user Alex 501, as shown by link 514, so Alex satisfies rule clause 4.1. Event $E_1$ contains pictures $P_1$ 518 through $P_n$. Moreover, Event $E_1$ has activity type Outdoor Sports, shown by nodes 513 and 510 and "classifiedAs" link 512. Consequently, rule clause 4.2 is satisfied by binding the variable EventType to Outdoor Sports.

A set of pictures making up an event is considered to feature a particular person if that person is portrayed in the pictures. More complex definitions of what it means for a set of pictures to feature a person may be defined to require that the person be predominantly portrayed in those pictures, for example, appearing in a majority of the pictures, etc. Using the simple definition that an event features a person if the person appears in a picture belonging to the event, the rule clause 4.3 is satisfied by binding the variable Person to Jane, in light of the statement represented by 518, 515 and 503. Clause 4.4 is satisfied by binding User to Alex, supported by the statement represented by 501, 502 and 503, that Alex is a parent of Jane. Clause 4.5 is satisfied by binding ActivityType to the class baseball, supported by the statement represented by 503, 504 and 506, that Jane likes baseball. Given the binding of ActivityType to baseball, clause 4.6 is satisfied by binding Product to the baseball album, using 519, 520 and 506. Given that baseball is a subclass of Outdoor Sports (506, 505, 507), the variable binding of Activity to baseball and EventType to Outdoor Sports satisfies clause 4.7 and so, by this example, the entire rule 4 is satisfied given the variable binding of User to Alex and Product to baseball album. More precisely, the variables are bound to the corresponding universal resource identifiers representing Alex and the baseball album product.

As noted previously, the preferred embodiment uses a Prolog inferencing engine to search for solutions to rules, where the rules are represented using Prolog clauses, but other mechanisms for describing constraints may also be used.

Referring to FIG. 12, there is illustrated a table intended to show some examples of rules and the associated metadata and/or algorithms required to make them work. These rules can be used in various combinations in a given rule set to facilitate automatic story generation. These rules are simply illustrative of the arbitrarily complex and unlimited types of rules that may be expressed within the system.

Figure 8:
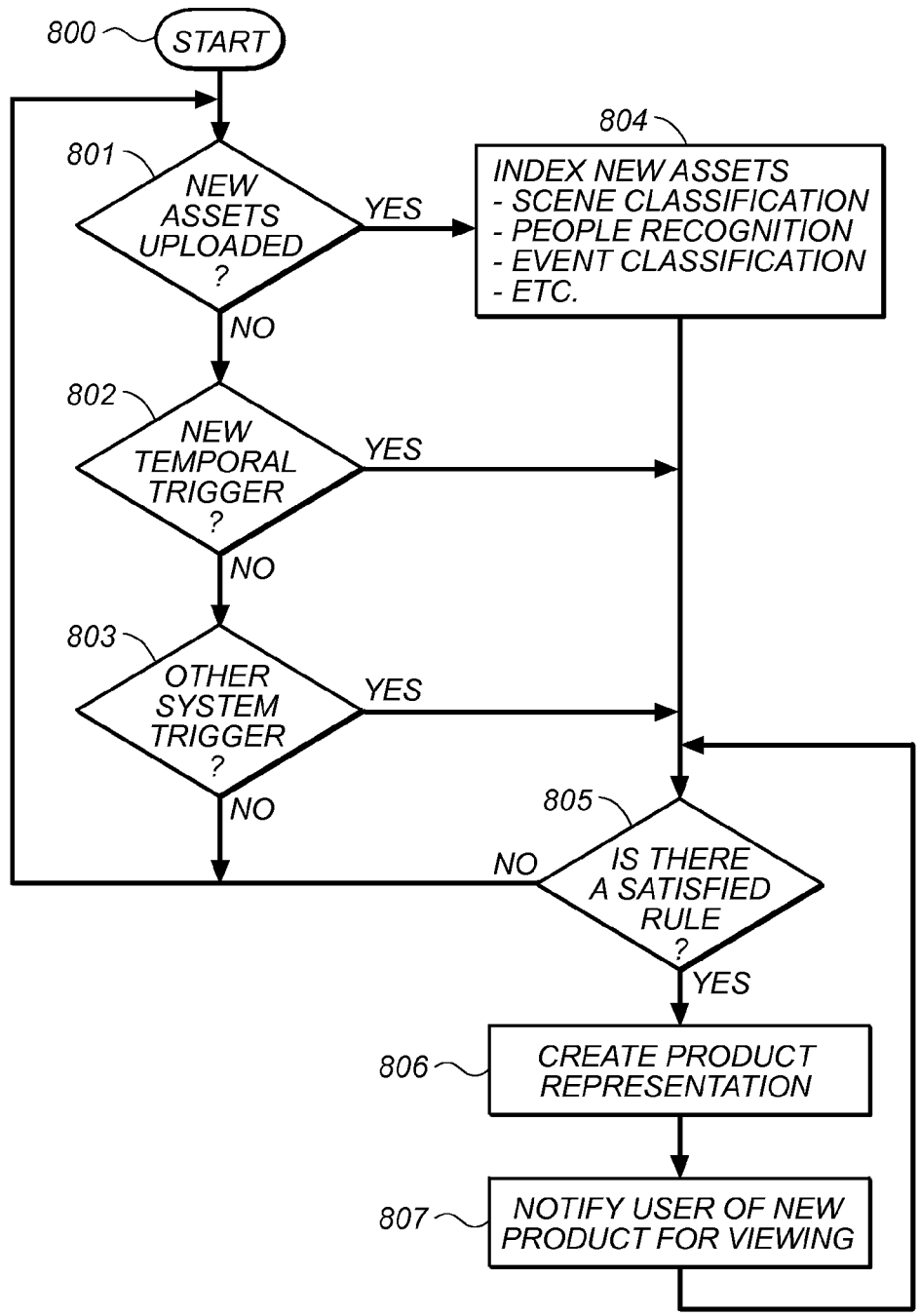
FIG. 8 is a flow chart illustrating a method of generating an image product.

Story Creation:

With reference to FIG. 8 there is illustrated a flow chart showing one preferred embodiment of a method for generating an image product. At step 800 the program begins. At step 801 the program checks whether there are new images uploaded to a folder or database in the computer system, such as by asset uploader 101. If so, the system indexes the newly uploaded assets at 804 by generating metadata to be stored with the assets. The metadata includes scene and event classification, people recognition, among other metadata that the system generates as has been described herein. If not, the system checks whether there are any temporal triggers 802 for generating a story product, such as a holiday, birthday, or other calendar time or date. If not, the system checks whether there are other programmed triggers 803 such as ones based on user activity, or other time periods selected by a user. If there are active triggers or if the user has uploaded assets, the system begins checking the generated metadata and the metadata included with the images, such as may have been stored with the images by the capture device. The system determines whether the new uploaded assets or previously stored assets satisfy a story rule at step 805. If not, the program loops back checking for newly uploaded assets and triggers. If a story rule comprising a theme and product is satisfied, assets that satisfy the theme and rule are selected and a product created at step 806. The reader will appreciate that the steps of selecting a theme, product and assets may be combined into a single step or performed in various other combinations. An image product is created based on the selected assets at step 806 and the user is notified that a product is available for viewing at step 807.

Figure 9:
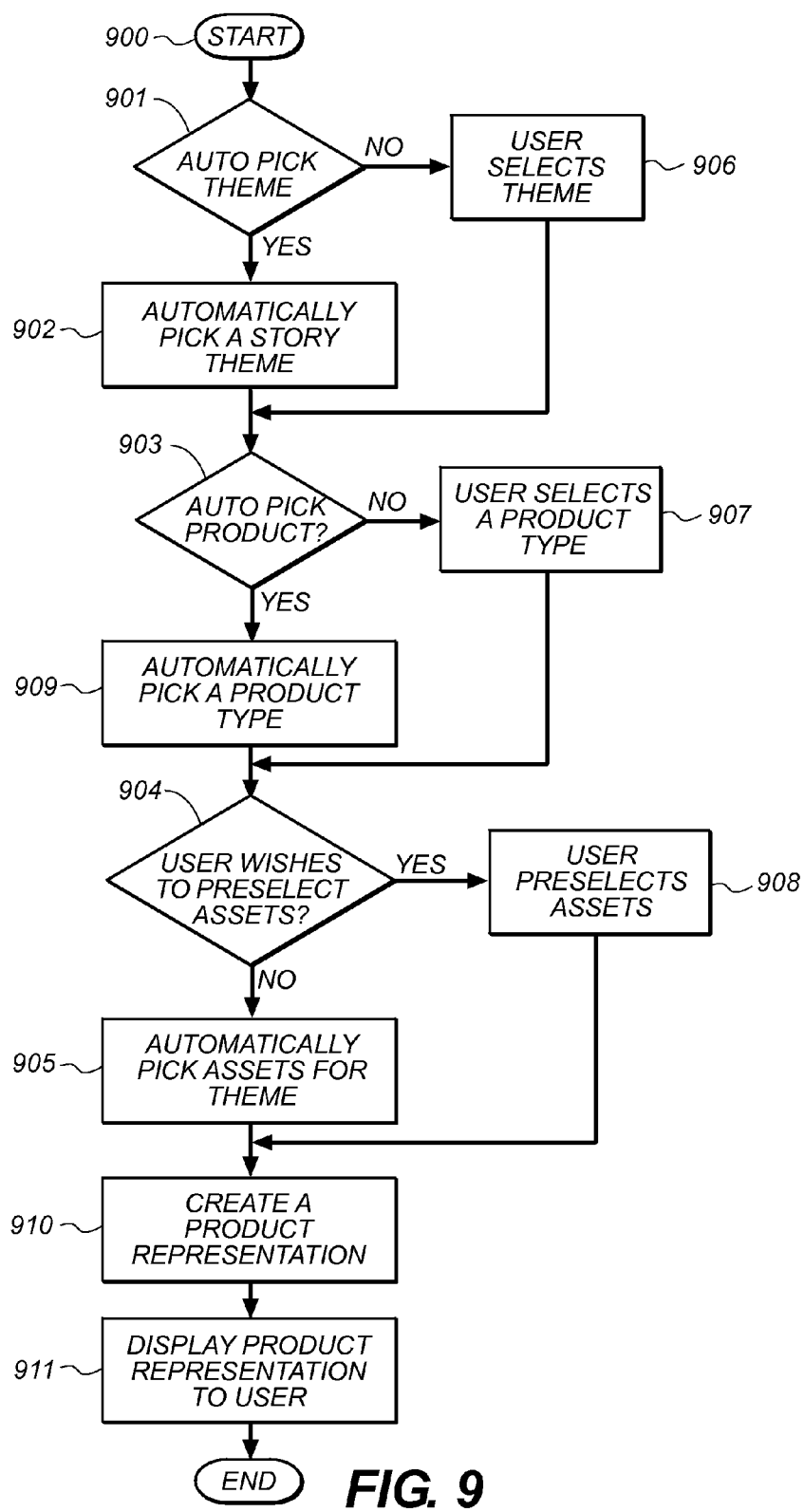
FIG. 9 is a flow chart illustrating a second method of generating an image product.

With reference to FIG. 9 there is illustrated a flow chart showing another preferred embodiment of a method for generating an image product. The method starts at 900. At step 901 a theme for a story can either be automatically selected 902 or it can be manually selected 906 by a user. An example of a theme is Mother's Day. The selected theme defines a set of rules for selecting a number of assets to use in creating the image product. After theme selection, at step 903 a product type can be automatically selected 909 or manually selected 907. After product type selection, at step 904 assets can be automatically selected 905 from an asset database or manually pre-selected 908. After asset selection, at step 910 the image product (or product representation) is automatically created by programmed steps as described herein, and is presented to the user for approval at step 911. Based on the selected assets, a product can include, for example, a hard-copy album, slide show, DVD, collage, multimedia presentation, screen saver, mug, t-shirt, greeting card, calendar, etc. The steps of asset selection and creating a product representation can optionally be reversed because the product representation may impact the asset selection rules and vice versa. With the example story theme of Mother's Day, a product representation might be a hard-copy album. The same asset selection rules may apply to other image product forms for example, the images chosen to make a hard copy album might work just as well to make a DVD.

Figure 10:
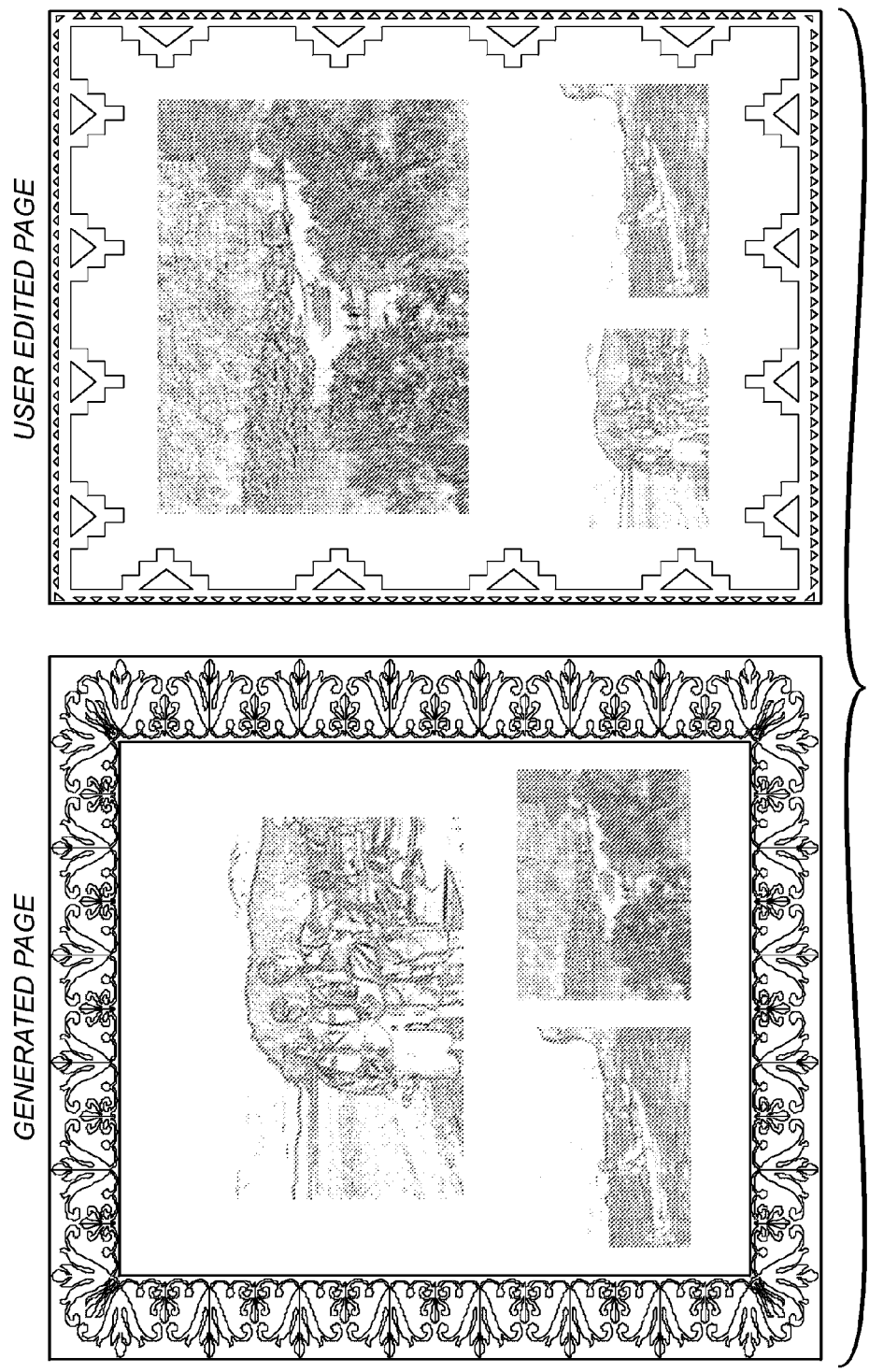
FIG. 10 illustrates an example user edited version of an image product.

Another preferred embodiment of the present invention includes the option of providing the user with edit capability for editing an image product that is presented to the user for his or her approval. With reference to FIG. 10, there is illustrated a system generated product page showing photographs surrounded by a system selected border. Also illustrated is another version of that product page showing a rendition edited by the user using an image editing application commonly available for installation on a personal computer, for example. As illustrated in FIG. 10, the user has rearranged the photographs, has chosen a different border pattern, and has selected a different one of the photographs to be shown in an enlarged format.

The methods, systems, software, and product distribution media described herein, illustrate embodiments of the present invention wherein a computer program automatically creates a composite image product. Part of the power of the present invention is that it allows automatic asset selection whereby the computer system selects a subset of images in an intelligent fashion so that, for example, all the pictures in a collection need not be included in the image product. The number of assets selected may be determined by the output product desired. As another example, if a two-minute multimedia presentation is selected at a transition rate of four seconds per slide, this would require thirty images. This constraint may be specified as part of a programmed rule set.

The computer system may generate image products based on calendar entries that identify significant dates. The dates may be personally significant, such as anniversaries or birthdays, or they may be holidays such as Mother's Day or New Years Day. The data for these calendar dates may be input to the system by users or they may be inferred by the programmed computer system. One method for the system to infer dates that are significant to the user is to track dates when images are captured or uploaded to the system and the categories of those images. The system can then infer significant dates if particular types of images are captured or uploaded at the same time on an annual, or some other, basis.

Figure 11:
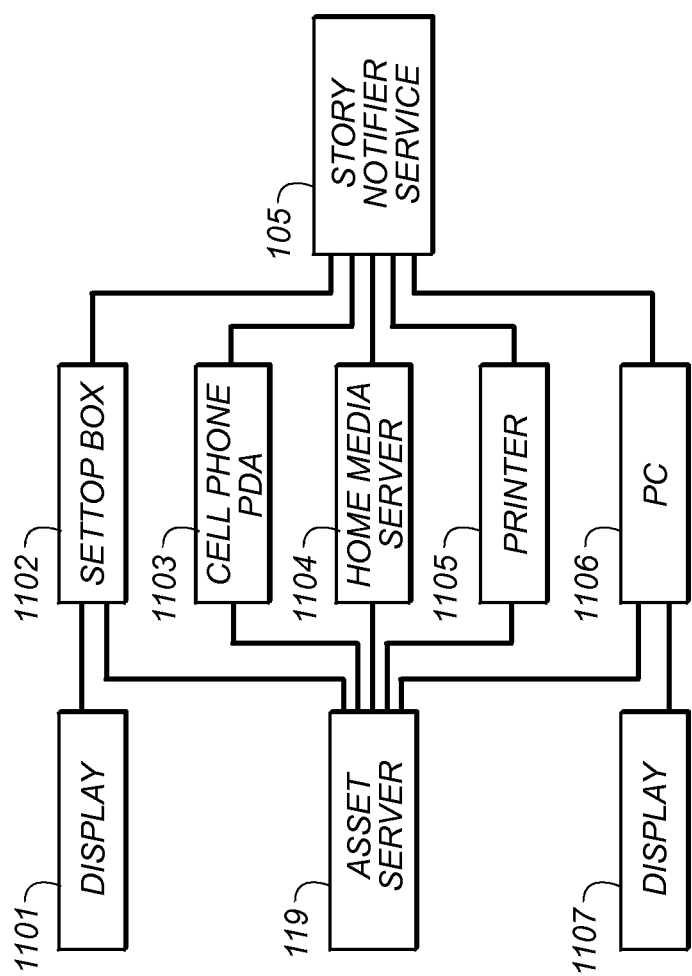
FIG. 11 illustrates communication schemes for sending notifications that image products are completed and for sending the image products themselves.

With reference to FIG. 11 the previously described components story notifier service 105 and asset server 119 are illustrated coupled over network connections that may include Internet access or local networks, either of which may be accessed via standard cable or phone line access and may also include wireless network access such as is common in cell and Wi-Fi networks. The story notifier service and asset server are capable of interacting with various network devices over network connections to inform the user that a story has been created and to enable the user to view the story. Each of the illustrated device types such as a set top box 1102, cell phone or PDA 1103, a home media server 1104, printer 1105 and PC 1106, may include a story notifier 103 (not shown) and story viewer 102 (not shown). For example, the user may have a story notifier running on set-top box 1102 connected to display 1101. The user may view the story directly on the display. Alternatively, the user may receive notification via a story notifier running on cell phone 1103, and then view the story either directly on a multimedia capable cell phone and/or on a larger format device, such as a PC 1106 with an attached display 1107.

It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention. Accordingly, the scope of protection for this invention is limited only by the following claims and their equivalents.

What is claimed is:

1. A method comprising:
    automatically grouping, by a processing system, a plurality of digital image assets into one or more groupings based on metadata for the plurality of digital image assets;
    classifying, by the processing system, each grouping of the one or more groupings by event type;
    identifying, by the processing system, a person portrayed in each grouping;
    identifying, by the processing system, a sub-classification for each grouping based upon a user profile and the identified person;
    identifying, by the processing system, a product theme that is associated with the identified sub-classification for each grouping and is associated with a determined interest of the identified person;
    identifying, by the processing system, a triggering event to evaluate the plurality of digital image assets for assets required by the product theme; and
    automatically producing, by the processing system in response to the identified triggering event, a media product based upon the identified product theme, where the media product includes assets automatically selected from one of the one or more groupings of the digital image assets.

2. The method of claim 1, wherein the user profile includes an indication of a relationship of the person to a product creator, and wherein the identifying the sub-classification for each grouping based upon the user profile and the identified person comprises recognizing the relationship of the person to the product creator based on the indication of the relationship within the user profile.

3. The method of claim 1, wherein the classifying each grouping of the one or more groupings by event type and the identifying the sub-classification for each grouping is performed according to a hierarchically structured interest and activity ontology, wherein the classifying each grouping comprises determining a classification for each grouping, and wherein the sub-classification comprises a sub-classification under the classification.

4. The method of claim 3, wherein the identifying the product theme associated with the identified sub-classification comprises determining that an interest of the person is associated with the classification for the respective grouping.

5. The method of claim 1, wherein the identifying the person portrayed in each grouping comprises comparing information discerned about the person from each grouping to information about the person stored in a database.

6. The method of claim 1, further comprising providing a notification that the media product has been generated.

7. The method of claim 1, further comprises indexing, by the processing system, the plurality of digital image assets.

8. The method of claim 7, wherein the indexing comprises categorizing a scene in a digital image asset into a scene type.

9. The method of claim 7, wherein the indexing comprises:
    deriving, by the processing system, information from a digital image asset; and
    storing the derived information as metadata with the digital image asset.

10. The method of claim 1, wherein the identifying the product theme associated with the identified sub-classification is performed on a periodic basis.

11. The method of claim 1, wherein the identifying the product theme associated with the identified sub-classification is performed in response to detecting an upcoming event.

12. The method of claim 1, wherein the identifying the product theme associated with the identified sub-classification comprises consulting a product catalog ontology that associates specific product themes with specific sub-classifications.

13. The method of claim 1, wherein the identifying the product theme associated with the identified sub-classification comprises determining that the person has an interest that is associated with the product theme.

14. The method of claim 1, wherein the triggering event comprises an approaching significant date determined, by the processing system, during the evaluation of the plurality of digital image assets, wherein the significant date is inferred based on a frequency and type of user activity during a time period near the significant date.

15. The method of claim 14, wherein the frequency and type of user activity comprises a frequency of how often one or more of the plurality of digital image assets are accessed.

16. A system comprising:
    a memory configured to store a plurality of digital image assets; and a computer system configured to:
    automatically group the plurality of digital image assets into one or more groupings based on metadata for the plurality of digital image assets;
    classify each grouping of the one or more groupings by event type;
    identify a person portrayed in each grouping;
    identify a sub-classification for each grouping based upon a user profile and the identified person;
    identify a product theme associated with the identified sub-classification for each grouping;
    identify a triggering event to evaluate the plurality of digital image assets for assets required by the product theme; and
    automatically produce, in response to the identified triggering event, a media product based upon the identified product theme, where the media product includes assets automatically selected from one of the one or more groupings of the digital image assets.

17. The system of claim 16, wherein the user profile includes an indication of a relationship of the person to a product creator, and wherein, to identify the sub-classification for each grouping based upon the user profile and the identified person, the processing system is further configured to recognize the relationship of the person to the product creator based on the indication of the relationship within the user profile.

18. The system of claim 16, wherein the processing system is configured to classify each grouping of the one or more groupings by event type and identify the sub-classification for each grouping according to a hierarchically structured interest and activity ontology, wherein, to classify each grouping, the processing system is further configured to determine a classification for each grouping, and wherein the sub-classification comprises a sub-classification under the classification.

19. The system of claim 18, wherein, to identify the product theme associated with the identified sub-classification, the processing system is further configured to determine that an interest of the person is associated with the classification for the respective grouping.

20. A non-transitory computer-readable medium having instructions stored thereon that, upon execution by a computing device, cause the computing device to perform operations comprising:
    automatically grouping a plurality of digital image assets into one or more groupings based on metadata for the plurality of digital image assets;
    classifying each grouping of the one or more groupings by event type;
    identifying a person portrayed in each grouping;
    identifying a sub-classification for each grouping based upon a user profile and the identified person;
    identifying a product theme associated with the identified sub-classification for each grouping;
    identifying a triggering event to evaluate the plurality of digital image assets for assets required by the product theme; and
    automatically producing, in response to the identified triggering event, a media product based upon the identified product theme, where the media product includes assets automatically selected from one of the one or more groupings of the digital image assets.

* * * * *